US012748015B2

(12) United States Patent
Sung et al.

(10) Patent No.: US 12,748,015 B2
(45) Date of Patent: Sep. 29, 2026

(54) TRANSDUCER GEOMETRY FOR AMPLIFICATION OF AXIAL LOAD RESPONSE AND SUPPRESSION OF NON-AXIAL RESPONSE

(71) Applicants: UNIVERSITY OF MARYLAND, BALTIMORE COUNTY, Baltimore, MD (US); NATIONAL AERONAUTICS AND SPACE ADMINISTRATION LANGLEY RESEARCH CENTER, Hampton, VA (US)

(72) Inventors: Myung K. Sung, Baltimore, MD (US); Soobum Lee, Baltimore, MD (US); Jude Persia, Baltimore, MD (US); Devin E. Burns, Hampton, VA (US)

(73) Assignees: University of Maryland, Baltimore County, Baltimore, MD (US); National Aeronautics and Space Administration Langley Research Center, Hampton, VA (US)

( * ) Notice: Subject to any disclaimer, the term of this patent is extended or adjusted under 35 U.S.C. 154(b) by 371 days.

(21) Appl. No.: 18/539,064

(22) Filed: Dec. 13, 2023

(65) Prior Publication Data

US 2024/0192081 A1 Jun. 13, 2024

Related U.S. Application Data

(60) Provisional application No. 63/432,227, filed on Dec. 13, 2022.

(51) Int. Cl.
*G01M 9/06* (2006.01)
*G01L 1/22* (2006.01)

(52) U.S. Cl.
CPC ........... *G01M 9/062* (2013.01); *G01L 1/2262* (2013.01); *G01L 1/2287* (2013.01)

(58) Field of Classification Search
CPC ..... G01M 9/062; G01L 1/2262; G01L 1/2287
See application file for complete search history.

(56) References Cited

U.S. PATENT DOCUMENTS 10,267,708 B2 4/2019 Skube et al.
2018/0335364 A1* 11/2018 Skube ..................... G01M 9/04
(Continued)

FOREIGN PATENT DOCUMENTS

CN 113465802 B * 12/2022 ............... G01L 3/22
DE 102023102666 A1 * 8/2023 ............... G01L 3/00

OTHER PUBLICATIONS

Sung et al., Robust topology optimization of a flexural structure considering multi-stress performance for force sensing and structural safety. Struct. Multidisc Optim 65:6(2022). 21 pages.
(Continued)

*Primary Examiner* — Jamel E Williams
(74) *Attorney, Agent, or Firm* — Casimir Jones, S.C.; Thomas Lyneis; Tristan A. Fuierer

(57) ABSTRACT

This present disclosure is about a wind tunnel balance axial section. A wind tunnel balance is a sensor that measures six force/moment components from a test model in a wind tunnel. An axial section, one of the six measurement sections in the balance, is the hardest section to design because it is often required to measure an axial force which is much smaller than other force components. Therefore, there is a specific design requirement for the axial section to selectively amplify the axial force response and suppress the non-axial responses. This disclosure presents a sensor mechanism composed of elastic linkages to achieve this design requirements for the axial section.

10 Claims, 7 Drawing Sheets

(56) References Cited

U.S. PATENT DOCUMENTS

2024/0019239 A1* 1/2024 Holmer .................... G01B 7/20
2024/0255366 A1* 8/2024 Hishinuma ............. G01L 1/225

OTHER PUBLICATIONS

Sung et al., Design of a Wind Tunnel Balance using Topology Optimization Considering Multifunctional Stress Performance. AIA A SciTech Forum, Jan. 2021. DOI: 10.2514/6.2021-1687. 15 pages.
Burns et al., Wind Tunnel Balance Design: A NASA Langley Perspective. Old Dominion University. Apr. 2019. Cannot Locate.
Burns et al., Wind Tunnel Balance Design: A NASA Langley Perspective, 2020. https://ntrs.nasa.gov/citations/20200002944. 83 pages.
Dubois, Six-component strain-gage balances for large wind tunnels, Exp. Mech. 21 (1981) 401-407.
Ewald, Multi-component force balances for conventional and cryogenic wind tunnels, Meas. Sci. Technol. 11 (2000) R81-R94.
Hansen, R.M. Mechanical design and Fabrication of Strain-Gage Balances. AGARD Rep. 9, 14 pp., 1956. Considers wire-strain-gage-balance design concepts from a practical standpoint. A typical balance illustrates how the concepts were applied in practice. Abstract Only. 5 pages.
Heywood R B, Photoelasticity for Engineers, Pergamon Press Ltd. 1969. TOC only. 16 pages.
Kang et al., Shape optimization of a mechanically decoupled six-axis force/torque sensor, Sensors Actuators, A Phys. (2014) 209, Accepted Manusript 1-27.
KEBEDE et a., Decoupled Six-Axis Force—Moment Sensor with a Novel Strain Gauge Arrangement and Error Reduction Techniques, Sensors. 2019, 19(13), 3012, 1-14.
Lee et al., Data-driven system health monitoring technique using autoencoder for the safety management of commercial aircraft, Neural Comput. Appl. (2020). 16 pages.
Lee et al., Real-time anomaly detection framework using a support vector regression for the safety monitoring of commercial aircraft, Adv. Eng. Informatics. 44 (2020) 101071. 12 pages.
Liang et al., Novel decoupling algorithm based on parallel voltage extreme learning machine (PV-ELM) for six-axis F/M sensors, Robot. Comput. Integr. Manuf. 2019, 57, 303-314.
Liu et al., A novel six-component force sensor of good measurement isotropy and sensitivities, Sensors Actuators A Phys. 100 (2002) 223-230.
Samardžic et al., An elastic element of the forced oscillation apparatus for dynamic wind tunnel measurements, Aerosp. Sci. Technol. 50 (2016) 272-280.
Sung et al., Robust Topology Optimization of a Flexural Structure Considering Multi-Stress Performance for Force Sensing and Structural Safety. Struct. Multidisc Optim 65,6(2022). Abstract only. 18 pages.
Swapna et al., Shape Optimization of a Drag Force Element of a Force Transducer for Wind Tunnel Measurements, 5 (2015) 33-38.
Templeman et al., Multi-axis force sensors: A state-of-the-art review, Sensors Actuators A Phys. 304 (2020) 111772. 17 pages.
Tropea et al., Handbook of experimental fluid mechanics, Springer Science & Business Media, 2007. TOC only. 8 pages.
Zhai et al., An investigation on the interference of internal six-component wind tunnel balances with FEM, in: ICIASF '95 Rec. Int. Congr. Instrum. Aerosp. Simul. Facil., 1995: pp. 16/1-1610.
Zhang et al., Mechanical analysis of normal force interference on axial force measurement for internal sting balance, Aerosp. Sci. Technol. 58 (2016) 351-357. Accepted manuscript 15 pages.

* cited by examiner

| Load | | Axial | Normal | Pitch |
|---|---|---|---|---|
| Sensor response (MPa) | Sensor a | S | -T | V |
| | Sensor b | -S | -U | W (≅V) |
| | Sensor c | S | T | V |
| | Sensor d | -S | U | W |
| | Bridge circuit read | 4S | 0 | ≅0 |

FIGURE 7

TRANSDUCER GEOMETRY FOR AMPLIFICATION OF AXIAL LOAD RESPONSE AND SUPPRESSION OF NON-AXIAL RESPONSE

CROSS REFERENCE TO RELATED APPLICATIONS

This application claims priority U.S. Provisional Patent Application No. 63/432,227 filed on Dec. 13, 2022 in the name of Myung K. SUNG et al. and entitled "New Transducer Geometry for Amplification of Axial Load Response and Suppression of Non-Axil Response," which is hereby incorporated by reference herein in its entirety.

STATEMENT OF FEDERALLY SPONSORED RESEARCH

This invention was made with government support under Contract Number NNL13AA08B awarded by The National Aeronautics and Space Administration (NASA). The government has certain rights in the invention.

BACKGROUND OF THE INVENTION

Six-component force and moment sensors are widely used in both industrial and research settings. Many of these sensors utilize elastic deformation to measure force and moment components precisely [1, 2]. A wind tunnel balance is a kind of six-axis sensor that measures six force/moment components (Fx, Fy, Fz, Mx, My, Mz: axial/normal/side force, roll/yaw/pitching moment, respectively) from a test model in a wind tunnel. FIG. 1 shows a conventional internal balance, which is mounted inside the test model to measure the forces. It also provides the structural link between the test model and ground. This design was established in the mid-1960s and largely remains the same to date.

The balance needs to be designed to measure forces and moments accurately when force components are applying simultaneously [3]. The balance is divided into six measurement sections to measure forces and moments separately, and the design of the axial section is the most challenging because the axial force is substantially smaller than other force and moment components.

FIG. 1 shows a traditional design of the wind tunnel balance. The left end of the balance (1) is fixed to ground, and the right end (2) is connected to the test model which delivers forces. The axial force is measured in the axial section (3) through the central vertical beam (measuring beam, 4). Flex beams (5) are positioned adjacent to the measuring beam. Under axial load, the flex beams undergo "S" shaped bending with a relatively large amount of displacement compared to the extended (tensile) response when under normal load. Two narrowed horizontal beams, in conjunction with the measuring beam, form a "T" shaped connection (6) known as the T-strap [4]. Under axial load, two narrowed beams provide a flexible connection to the measuring beam that reduces the stress gradient and improves the sensitivity [5]. In this traditional design, strain gauges are attached to the middle of the measuring beam along the vertical length (4) [6-8] and connected to a full Wheatstone bridge circuit that amplifies the axial force signal and minimizes the signal from other forces by mutual cancellation. There have been several studies to reduce the coupling error using geometry changes [9, 10], shape optimization [3], signal processing [11], and machine learning [12-14]. Additional studies have sought to accurately measure the axial force using shape optimization of the vertical hinge [15, 16]. Another study modified the Wheatstone bridge equation for interference error reduction [17]. However, previous studies based on this conventional force balance geometry works well for a limited axial-to-normal force ratio—1:4 [18, 19], 1:6.25 [20]. In practice, it is essential to develop a new axial section design to handle a high axial-to-normal force ratio, e.g., axial:normal=1:10 or more. Another drawback of this design is a high manufacturing cost due to multiple Electrical Discharge Machining (EDM) processes to realize a complex 3D layout.

BRIEF SUMMARY

The disclosure provides, in one aspect, a strain gauge assembly comprising: a base with a ground end and a model end positioned along a major axis, a pair of measuring beams substantially elongate in shape positioned oblique to the base's major axis; a series of strain gauges affixed to the measuring beams and configured to measure strain experienced by the measuring beams; and wherein, the series of flexures are arranged and configured to elastically deform and amplify the strain experienced by at least one strain gauge from the series of strain gauges when the base experiences an axial load.

In some embodiments, the series of flexures comprises a substantially X-shaped flexure operatively connecting a first measuring beam from the pair of measuring beams to a second measuring beam from the pair of measuring beams.

In some embodiments, the series of flexures comprises a pair of ground end flexures operatively connecting the ground end of the base to one of the measuring beams from the pair of measuring beams, and a pair of model end flexures operatively connecting the model end of the base to the other measuring beam from the pair of measuring beams.

In some embodiments, the pair of ground end flexures are operatively connected to each other by an intermediate ground end flexure, and the pair of model end flexures are operatively connected to each other by an intermediate model end flexure.

In some embodiments, the strain gauge further comprises a pair of intermediate bodies respectively disposed between and operatively connecting the measuring beams and the end flexures.

In some embodiments, the series of flexures includes a central flexure substantially parallel to the base's major axis operatively connecting the ground end of the base to the model end of the base. In some embodiments, the measuring beams are substantially trapezoidal in shape.

In some embodiments, the flexures that make up the series of flexures include substantially elliptical fillets on either end.

In some embodiments, at least one strain gauge from the series of strain gauges is a Wheatstone bridge.

In some embodiments, the base, the pair of measuring beams, and series of flexures are formed of a single isotropic material.

Definitions

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. By way of example, "an element" means at least one element and can include more than one element. The present disclosure also contemplates other embodiments "comprising," "consisting of" and "consisting essentially of," the embodiments or elements presented herein, whether explicitly set forth or not. As used herein, "and/or" refers to and encompasses any and all possible combinations of one or more of the associated listed items, as well as the lack of combinations where interpreted in the alternative ("or").

The terms "substantially" or "generally" are used to provide flexibility by recognizing that a given characteristic need not be perfectly embodied to have the desired result. Those of ordinary skill in the art will recognize that many characteristics described herein may be essentially present without strict adherence to the characteristic's definition.

The terms "elliptical," means relating to or being characteristic of an ellipse, the two-dimensional shape formed from the set of all points on an XY-plane, whose distance from two fixed points (known as foci) adds up to a constant value. The major axis of an ellipse is defined along its longest diameter going through the center from one end to the other, at the broad part of the ellipse. Whereas its minor axis is the shortest diameter of ellipse, crossing through the center at the narrowest part. This contrasts with a circle whose foci are at the same point, which is the center of the circle.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

DESCRIPTION OF DRAWINGS

FIG. 7 summarizes the bridge circuit response by three different loads.

DETAILED DESCRIPTION

Figure 1:
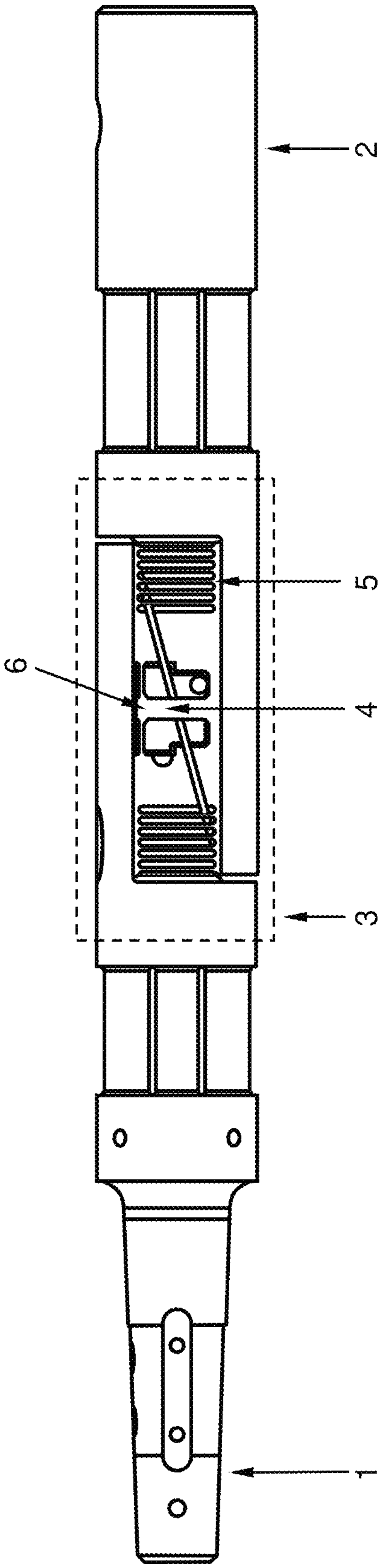
FIG. 1 is the traditional wind tunnel balance.
Figure 2:
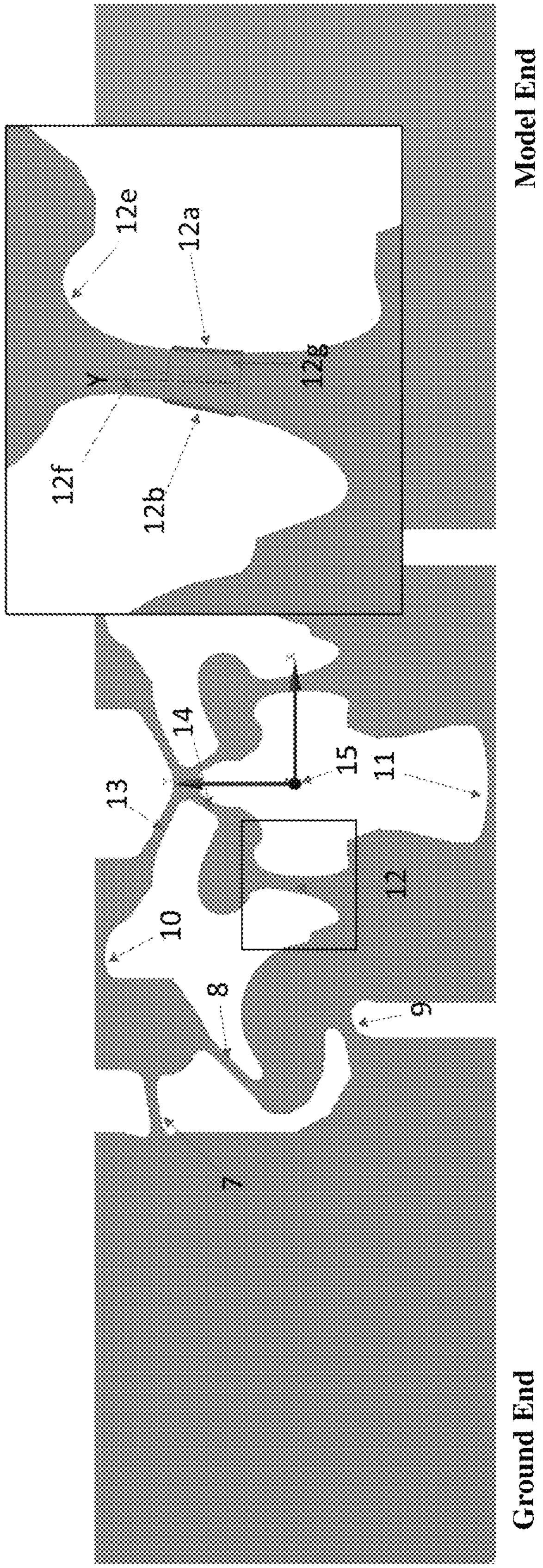
FIG. 2 is the presently disclosed axial section of a wind tunnel balance using topology optimization.
Figure 3:
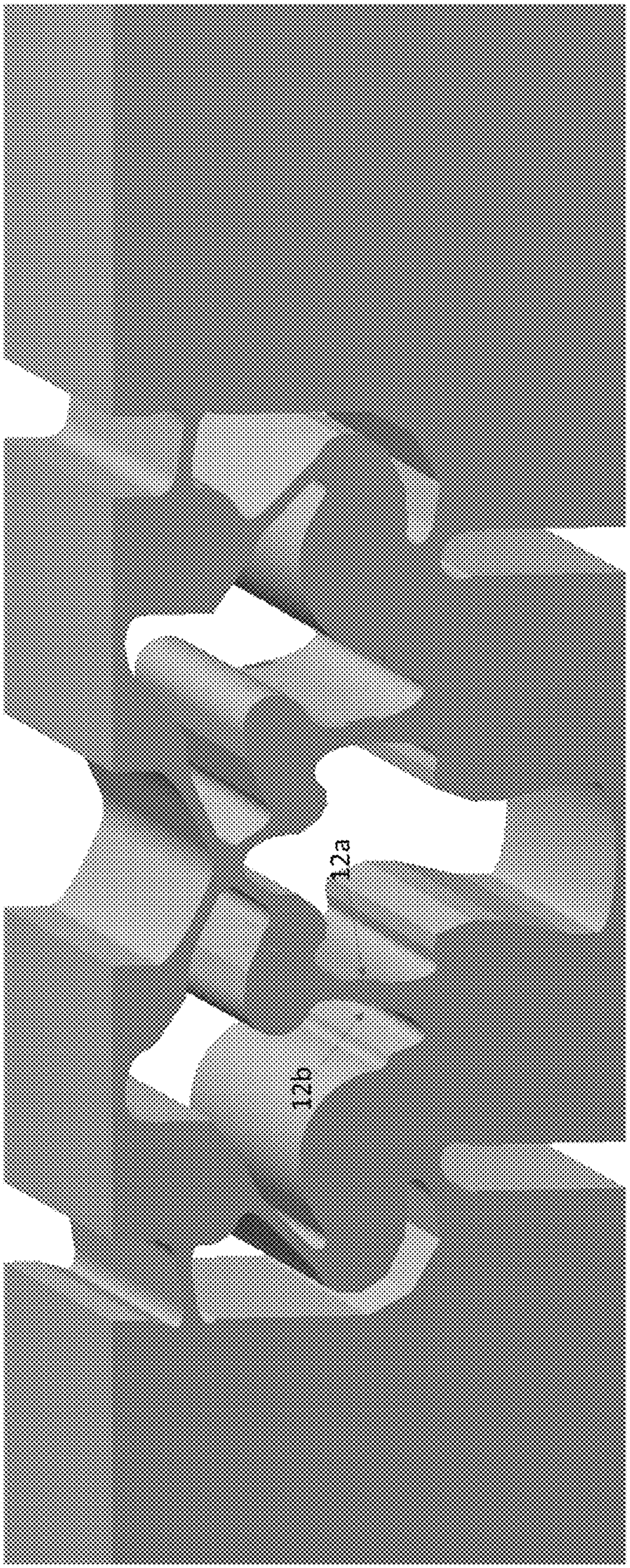
FIG. 3 shows the sensor areas in 3D.

FIG. 2 shows the disclosed axial section of the internal wind tunnel balance. Topology optimization was used to design a 2D geometry that generates high strain reading under axial load and small strain reading under normal load. One can review the detailed topology optimization formulation in [21], but this document is focused on explaining the working principle of this new geometry. The design is symmetric about the Y axis considering all combinations of changeable load directions. The flexure points are numbered on the left half (ground end) of the symmetry plane from (7) to (14) as shown in FIG. 2. Flexures (7) and (9) are the outermost flexures, referred to as ground end flexures, an intermediate ground end flexure (8) connects flexures (7) and (9), upper flexure (10) and central flexure (11) are the upper and lower extremities, (12) is the measuring beam (where strain gauges are located), and (13) and (14) form the X-shaped flexure. All referenced flexures have corresponding mirrored flexures on the right half (model half) of the base, except for flexure (11) which intersects the central Y axis. The origin and coordinate system are marked by (15). The 2D design is extruded about the Z axis (outwards from page) with the thickness being the same dimension as the height along the Y axis (as shown in FIG. 3). It is noted that this flexural geometry uses isotropic properties and there is no need to combine different kinds of materials, so it can be easily manufactured using EDM cutting or 3D printing. Those of ordinally skill in the art would recognize that many different types of rigid materials having the necessary elastic properties may be used to form the disclosed geometry, including various isotropic metal alloys and composites.

In this article, the working principle is described using the numbering of the left half of the symmetry plane. The flexures (7~14) act as either compressive beams or compliant hinges under the various loading conditions. Many of the flexures exhibit bending behavior similar to distinct components in the traditional axial design. The key difference is the type of bending of the measuring beams (12); they bend in an "S" shape under non-axial loads which differs from the "C" shape bending seen in traditional designs. This results in either side of the measuring beam experiencing both positive and negative stress at the same time.

For strain gauge measurement, the expanded view in FIG. 2 shows the measuring beam in greater detail. The strain gauges are attached along the straight lengths of (12*a*) and (12*b*). The corner fillets (12*e*) are elliptical with the major axis parallel with the length of the beam. This is applied across all corner fillets of the model to reduce stress concentration factors to a greater extent than circular fillets [22]. To attach the strain gauge on the lateral surface of the beam, one needs to secure sufficient lateral space from the beam. Two specific geometry features are considered to secure the space. First, the beam is slightly inclined off the Y axis by 7.5 degrees (12*f*), as opposed to conventional designs being fully vertical. Second, the measuring beam is designed to be sufficiently long. These adjustments may result in a shift of the stress gradient along the length of the beam, such as stress center shifted to the upper/lower fillets. To relocate the stress distribution back to the center, the measuring beam is designed as an isosceles trapezoid with the diagonals being 85.8 degrees normal to the base (12*g*). This also enables uniform strain distribution and enhances measurement accuracy when an axial load is applied.

FIG. 3 illustrates the design in 3D. This structure is a 2D surface extruded with its thickness dimension the same as the height, forming a square cross-section when viewed in the axial direction (X axis). With the design being uniform along the Z axis, the effects of the out of plane loads are minimal on the strain gauge locations in a standard Wheatstone bridge configuration. FIG. 3 also shows the sensor areas in 3D, where sensors are placed at the very edges of the beams and arranged in a complete bridge configuration.

Figure 4:
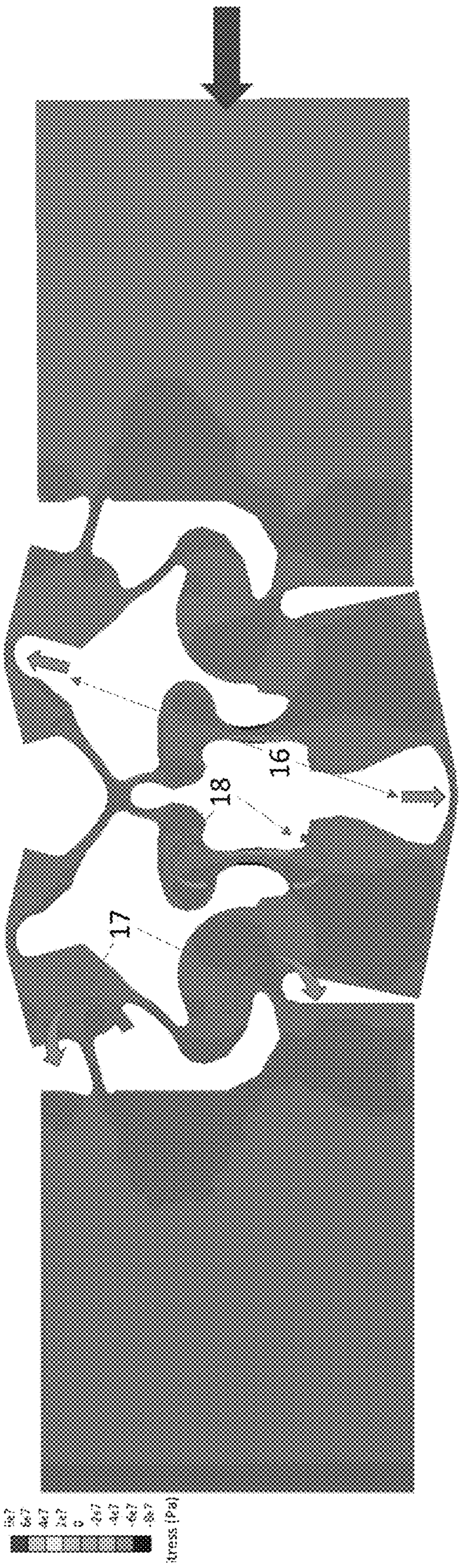
FIG. 4 shows the deformation of the axial section under axial load.
Figure 5:
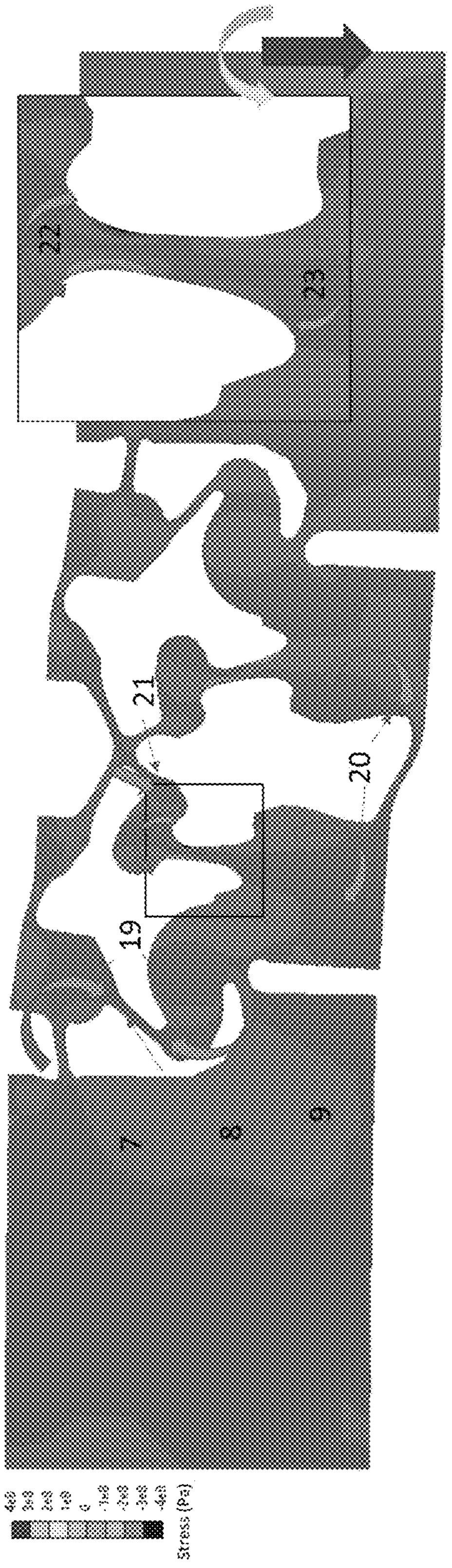
FIG. 5 shows the deformation of the axial section under normal load.

The detailed working principle is described in FIGS. 4 and 5 for the responses by axial and normal loading, respectively. In the load analysis, the leftmost surface is fixed and the loads are applied to the rightmost surface. The colored contour indicates the stress distribution where red as the highest (tension) and blue as the lowest (compression). Under axial load shown in FIG. 4, the measuring beams (12) respond in single bending—either tension or compression along each surface of the measuring beam. The pseudo-rigid body rotation (17) is generated centered at the leftmost connections (7, 9) as the pivot points. The rotation of the larger intermediate bodies (17) is enabled by the flexures (10, 11) located higher/lower than the flexures (7, 9) that connect to the fixed base. These rotations are opposite on a horizontal vertical plane, causing the upper section of the measuring beam to rotate counterclockwise and the lower clockwise (18). The X-shaped flexure (13, 14) at the upper center also works in line with this effect, deforming into the direction of two parallel vertical beams and causing the upper body of the measuring beam to rotate counterclockwise further. As a result, the two bodies connected to the measuring beam rotate in opposite directions, and the measuring beam bends in single bending and allows for a larger Y-directional stress measurement.

FIG. 5 shows the model under normal load. Different from FIG. 4, the measuring beams (12) respond in double bending like an "S" shape—the measuring beam is in tension at upper-left and lower-right, and in compression at upper-right and lower-left. This effect is shown in more detail in the expanded view of FIG. 5. The bodies connected to (7), (8), and (9) are rotated in the same direction in any orientation of normal load (clockwise direction in FIG. 5). To prevent excessive deflection under normal load, beam (8) restricts the amount of rotation of its connected bodies by being positioned directly between flexures (7) and (9) as indicated by (19). The body connected to flexure (9) is still able to rotate slightly clockwise on both halves of the symmetry plane, and the two clockwise rotations create a double bending in the lowest flexure (20). This rotation also affects the measuring beam, where the lower half is in compression on the left and tension on the right due to the clockwise rotation of the lower connecting body (23). Flexure 8, which is the lower half of the X-shaped flexure, is connected to the far-right side of the upper body of the measuring beam (21). When under normal load, the X-shaped beam directs a moment to the measuring beam by rotating the body connected to its upper half clockwise (22). This causes the upper-right side to be in compression and the upper-left side to be in tension. Since the measuring beam now has two opposing bending behaviors on its upper and lower halves, either side of the length of the beam experiences both positive and negative stresses (and zero in the middle) along the gauge measurement area. This results in a cancellation effect for the strain gauge since the overall sum of strain measured throughout the length is close to zero. This behavior is consistent between all load orientation combinations of normal load and pitching moment. As with the axial loading, this stress distribution is uniform throughout the thickness (Z) direction and allows for a flexible placement for strain gauging.

Figure 6:
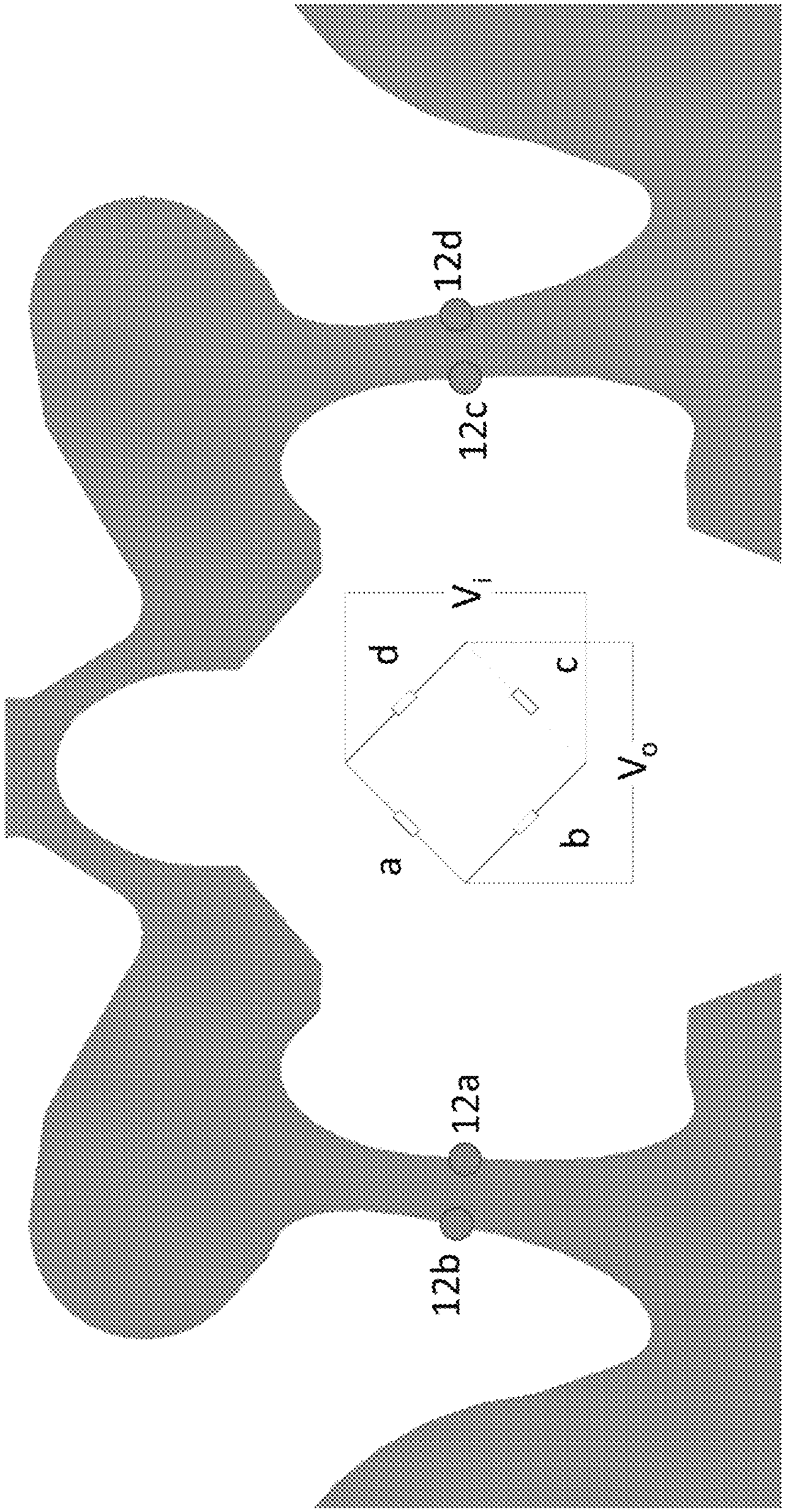
FIG. 6 shows the gauging strategy used between the two measuring beams.

FIG. 6 shows the gauging strategy used between the two measuring beams. The Wheatstone bridge circuit outputs a value that combines the sensor readings according to the following expression:

$$(S_a+S_c)-(S_b+S_d)$$

where $S_x$ denotes the sensor reading from sensor-x in FIG. 6. The bridge circuit response by three different loads are summarized in FIG. 7. It is observed that the axial load response is amplified through the measuring beam and non-axial load responses are suppressed. Under axial load, the pairs of sensors 12*a*-12*c* and 12*b*-12*d* have equal reading of magnitude (S) but different sign from each pair. Using the equation above, the final bridge reading value is effectively amplified by four times (4S). Under normal load, the pairs of sensors 12*a*-12*c* and 12*b*-12*d* are equal in magnitude (T and U) but opposite in sign. This produces a final output to zero. Under pitching moment, the sensor pairs of each measuring beam (12*a*-12*c* and 12*b*-12*d*) are the same sign but close in magnitude (V=W). This also produces a final output that is almost an order of magnitude lower than the axial response. The result is a feasible axial section that can be produced with an extrudable manufacturing method or 2D subtractive method (such as laser cutting or wire EDM) that only requires a fraction of time and resources when compared to a traditional design.

REFERENCES

[1] S. A. Liu, H. L. Tzo, A novel six-component force sensor of good measurement isotropy and sensitivities, Sensors Actuators A Phys. 100 (2002) 223-230.

[2] J. O. Templeman, B. B. Sheil, T. Sun, Multi-axis force sensors: A state-of-the-art review, Sensors Actuators A Phys. 304 (2020) 111772.

[3] M. K. Kang, S. Lee, J. H. Kim, Shape optimization of a mechanically decoupled six-axis force/torque sensor, Sensors Actuators, A Phys. (2014).

[4] Burns D, Parker P, Phillips B, Wind Tunnel Balance Design: A NASA Langley Perspective. Old Dominion University. 2019 April

[5] D. E. Burns, P. A. Parker, B. D. Phillips, T. L. Webb I I I, D. Landman, Wind Tunnel Balance Design: A NASA Langley Perspective, 2020.

[6] C. Tropea, A. L. Yarin, Handbook of experimental fluid mechanics, Springer Science & Business Media, 2007.

[7] B. F. R. Ewald, Multi-component force balances for conventional and cryogenic wind tunnels, Meas. Sci. Technol. 11 (2000) R81-R94.

[8] J. Zhai, B. Ewald, K. Hufnagel, An investigation on the interference of internal six-component wind tunnel balances with FEM, in: ICIASF '95 Rec. Int. Congr. Instrum. Aerosp. Simul. Facil., 1995: pp. 16/1-1610.

[9] R. M. Hansen, Mechanical Design and fabrication of strain-gage balance, 1956.

[10] M. Dubois, Six-component strain-gage balances for large wind tunnels, Exp. Mech. 21 (1981) 401-407.

[11] G. A. Kebede, A. R. Ahmad, S.-C. Lee, C.-Y. Lin, Decoupled Six-Axis Force-Moment Sensor with a Novel Strain Gauge Arrangement and Error Reduction Techniques, Sensors. 19 (2019).

[12] Q. Liang, J. Long, G. Coppola, D. Zhang, W. Sun, Novel decoupling algorithm based on parallel voltage extreme learning machine (PV-ELM) for six-axis F/M sensors, Robot. Comput. Integr. Manuf. (2019).

[13] H. Lee, H. J. Lim, A. Chattopadhyay, Data-driven system health monitoring technique using autoencoder for the safety management of commercial aircraft, Neural Comput. Appl. (2020).

[14] H. Lee, G. Li, A. Rai, A. Chattopadhyay, Real-time anomaly detection framework using a support vector regression for the safety monitoring of commercial aircraft, Adv. Eng. Informatics. 44 (2020) 101071.

[15] L. Swapna, B. Katta, B. S. Suresh, Shape Optimization of a Drag Force Element of a Force Transducer for Wind Tunnel Measurements, 5 (2015) 33-38.

[16] S. Skube, H. Bennett, Wind tunnel balance and method of use, U.S. Pat. No. 10,267,708 B2, 2019.

[17] S. Zhang, X. Li, H. Ma, H. Wen, Mechanical analysis of normal force interference on axial force measurement for internal sting balance, Aerosp. Sci. Technol. 58 (2016) 351-357.

[18] L. Swapna, B. Katta, B. S. Suresh, Shape Optimization of a Drag Force Element of a Force Transducer for Wind Tunnel Measurements, 5 (2015) 33-38.

[19] M. Samardžic, D. Marinkovski, Z. Anastasijević, D. Curčić, Z. Rajić, An elastic element of the forced oscillation apparatus for dynamic wind tunnel measurements, Aerosp. Sci. Technol. 50 (2016) 272-280.

[20] S. Zhang, X. Li, H. Ma, H. Wen, Mechanical analysis of normal force interference on axial force measurement for internal sting balance, Aerosp. Sci. Technol. 58 (2016) 351-357.

[21] M. Sung, S. Lee, and D. Burns, "Robust Topology Optimization of a Flexural Structure Considering Multi-Stress Performance for Force Sensing and Structural Safety," Struct. Multidiscip. O., Vol. 65, No. 1, pp. 1-21, 2022

[22] Heywood R B, Photoelasticity for Engineers, Pergamon Press Ltd. 1969.

What is claimed is:

1. A strain gauge assembly comprising:

a base with a ground end and a model end positioned along a major axis;

a pair of measuring beams substantially elongate in shape positioned oblique to the base's major axis;

a series of strain gauges affixed to the measuring beams and configured to measure strain experienced by the measuring beams; and a series of flexures operatively connecting the measuring beams to the ground end and model end of the base;

wherein, the series of flexures are arranged and configured to elastically deform and amplify the strain experienced by at least one strain gauge from the series of strain gauges when the base experiences an axial load.

2. The strain gauge assembly of claim 1, wherein the series of flexures comprises a substantially X-shaped flexure operatively connecting a first measuring beam from the pair of measuring beams to a second measuring beam from the pair of measuring beams.

3. The strain gauge assembly of claim 1, wherein the series of flexures comprises a pair of ground end flexures operatively connecting the ground end of the base to one of the measuring beams from the pair of measuring beams, and a pair of model end flexures operatively connecting the model end of the base to the other measuring beam from the pair of measuring beams.

4. The strain gauge assembly of claim 3, wherein the pair of ground end flexures are operatively connected to each other by an intermediate ground end flexure, and the pair of model end flexures are operatively connected to each other by an intermediate model end flexure.

5. The strain gauge assembly of claim 3, wherein the strain gauge further comprises a pair of intermediate bodies respectively disposed between and operatively connecting the measuring beams and the end flexures.

6. The strain gauge assembly of claim 1, wherein the series of flexures includes a central flexure substantially parallel to the base's major axis operatively connecting the ground end of the base to the model end of the base.

7. The strain gauge assembly of claim 1, wherein the measuring beams are substantially trapezoidal in shape.

8. The strain gauge assembly of claim 1, wherein the flexures that make up the series of flexures include substantially elliptical fillets on either end.

9. The strain gauge assembly of claim 1, wherein at least one strain gauge from the series of strain gauges is a Wheatstone bridge.

10. The strain gauge assembly of claim 1, wherein the base, the pair of measuring beams, and series of flexures are formed of a single isotropic material.

* * * * *